(Specimens.)

R. MARSH.

COMPOSITE TILING, PAVING, AND FLOORING SLAB OR BUILDING BLOCK.

No. 313,221. Patented Mar. 3, 1885.

WITNESSES:
C. Neveux
C. Sedgwick

INVENTOR:
R. Marsh
BY Munn &Co
ATTORNEYS.

UNITED STATES PATENT OFFICE.

ROBERT MARSH, OF BROOKLYN, NEW YORK.

COMPOSITE TILING, PAVING, AND FLOORING SLAB OR BUILDING-BLOCK.

SPECIFICATION forming part of Letters Patent No. 313,221, dated March 3, 1885.

Application filed May 24, 1884. (Specimens.)

*To all whom it may concern:*

Be it known that I, ROBERT MARSH, of Brooklyn, in the county of Kings and State of New York, have invented a new and Improved Composite Tiling, Paving, and Flooring Slab or Building-Block, of which the following is a full, clear, and exact description.

This invention consists of a tiling, flooring, paving, and building block or slab composed of Portland cement, asphaltum concrete, or other suitable artificial stone or cement material or similar substance molded in conjunction with pieces of tiling, glass, or other suitable material embedded in its face for ornamenting the slab or block or forming a part of the main body of said slab or block.

Reference is to be had to the accompanying drawings, forming part of this specification, in which similar letters of reference indicate corresponding parts in both the figures.

Figure 1:
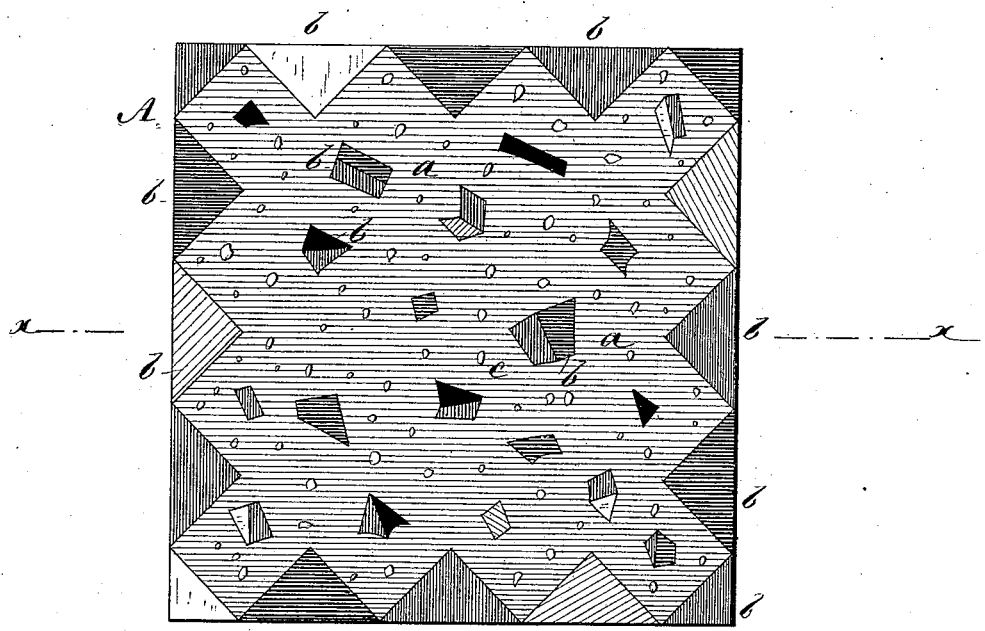
Figure 2:
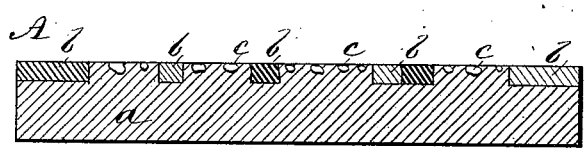

Figure 1 is a plan view of one form of my new and improved slab or block, and Fig. 2 is a sectional elevation of the same, taken on the line $x\ x$ of Fig. 1.

A represents my new composite slab or block, which may be of any suitable size and shape. It is composed of the main body $a$, of cement or concrete or similar substance, ornamental face-pieces $b$, and the small stones or pebbles $c$.

In making my new slab or block I first provide the face-pieces $b$, which are, by preference, pieces of encaustic or other tiling of various shapes and colors. These I arrange in an inverted position in a suitable mold to form any desired design. I then distribute the pebbles $c$ in the mold in the spaces not occupied by the face-pieces $b$. I then fill the mold with the material for forming the backing or main body $a$, tamping or pressing it well down into the mold, if found necessary, to cause it to encompass the pebbles and to perfectly fill all the spaces between the face-pieces $b$. The whole will then be left in the mold until the material of the body $a$ becomes set or sufficiently hardened to be handled without breaking, when upon removing the slab or block from the mold it will be found that the pebbles $c$ and face-pieces $b$ are embedded in and firmly held by the body $a$, forming a firm tile, slab, or block with a level and handsomely-ornamented face, all the ingredients or constituent parts having become securely united, each firmly adhering to all others to which it is adjacent.

For the main body $a$, I prefer to use Portland or other cement moistened in the ordinary way, a suitable admixture of silicate of soda being used to harden it; but instead of the foregoing any suitable artificial-stone material or asphaltum or other hard concrete material may be used; and instead of using pieces of encaustic or other tiling for ornamenting the face of the slab or block I may use pieces of glass, marble, or shells of various designs and colors, or I may use pieces of metal; and instead of making the slab or block square, as shown, it may be molded in any desired shape; or I may mold it in the form of a brick or block to be used in ornamenting the walls of buildings. When made in the form of a slab, it is adapted for various indoor and outdoor decorations, and for floors, walks, pavements, &c. The material of the body $a$ will in most cases be used in its natural color; but in some cases I shall color it, and in most instances I shall polish and glaze the face or outer surface of the slab or block. The face-pieces $b$ not only ornament the slab or block, but they also increase its durability, and the pebbles or small stones $c$ being at the surface of the slab prevent rapid wearing away of the exposed portions of the main body $a$, so that uneven wearing of the slab is prevented, and in some cases, instead of placing the pebbles $c$ in the mold as described, I shall mix the pebbles with the material composing the main body $a$ of the slab.

Having thus described my invention, what I claim as new, and desire to secure by Letters Patent, is—

1. As an improved article of manufacture, a composite tiling or flooring slab consisting of a body formed of a cement, asphaltum, or other composite material, and pieces of tiling, glass, or other suitable hard substance embedded therein flush with the surface of the same, substantially as set forth.

2. The combination, with the body of cement or analogous composition having pieces of tiling, glass, or other hard ornamental substance embedded therein flush with its surface, of gravel or small pieces of other hard substance embedded in said body portion between the said pieces of tiling or glass for the purpose of equalizing the wear of the body and the tiles, substantially as set forth.

3. The process of forming composite tiling, which consists in first placing pieces of tiling or other hard substance on the bottom of a mold, spaces being left between said pieces, then placing gravel or small pieces of other hard substance in the spaces between the pieces of tiling, and finally filling the mold with a cement or asphalt composition and pressing the same between the spaces of the pieces of tiling and gravel flush with their exposed surfaces to embed the same firmly therein and to form a wearing-surface of cement, tiling, and gravel, substantially as set forth.

ROBERT MARSH.

Witnesses:
H. A. WEST,
EDGAR TATE.